Nov. 27, 1951
H. M. TRENT
2,576,155
SUBMARINE COMPRESSIONAL WAVE RECEPTIVE APPARATUS
Filed March 26, 1946
2 SHEETS—SHEET 1
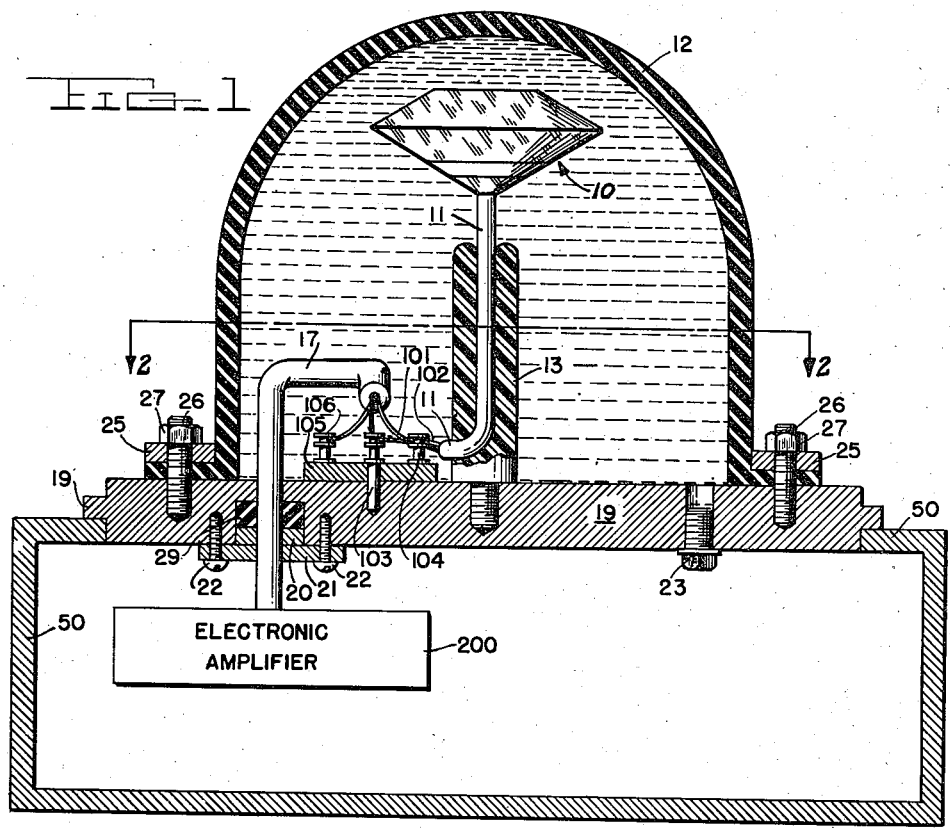
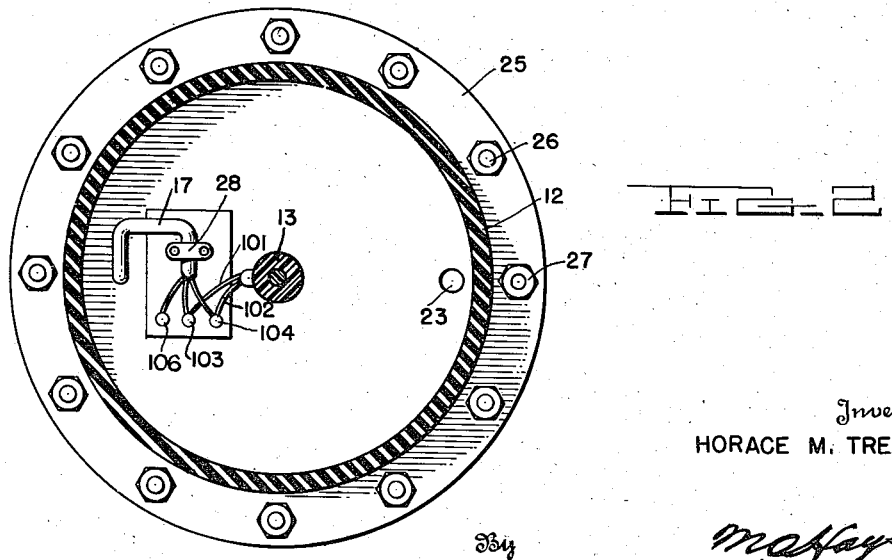
Inventors
HORACE M. TRENT
Attorney Nov. 27, 1951    H. M. TRENT    2,576,155
SUBMARINE COMPRESSIONAL WAVE RECEPTIVE APPARATUS
Filed March 26, 1946    2 SHEETS—SHEET 2
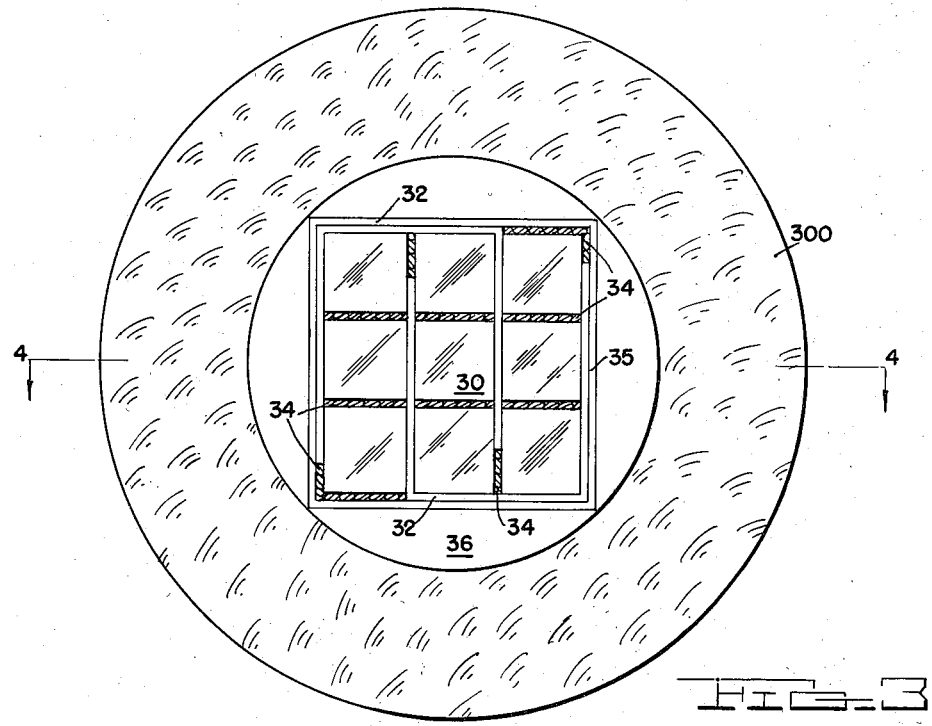
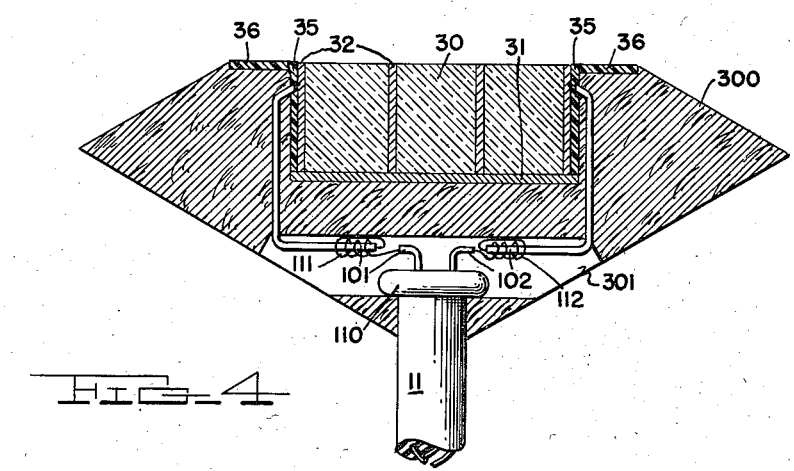
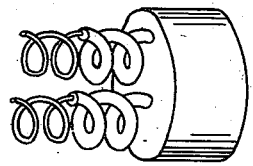
Inventor
HORACE M. TRENT Patented Nov. 27, 1951

2,576,155

UNITED STATES PATENT OFFICE 2,576,155

SUBMARINE COMPRESSIONAL WAVE
RECEPTIVE APPARATUS

Horace M. Trent, Alexandria, Va.

Application March 26, 1946, Serial No. 657,320

2 Claims. (Cl. 177—386)

(Granted under the act of March 3, 1883, as
amended April 30, 1928; 370 O. G. 757)

This invention relates to receiving apparatus for submarine compressional waves. It has particular application to a directional receiving apparatus which will maintain a single orientation of beam pattern in space.

Objects of the invention are to provide directive receiving apparatus for use in compressional wave systems which will maintain a vertical beam axis under all conditions, and which will be rugged and simple of construction, so that it may be committed to the water with severe shock and yet preserve its receptive properties for long periods of time.

Features of the invention are the correlation of the directional receptive properties of an array of piezoelectric crystals with the vertical-seeking property of a floatable mounting for the array, the use of a rubber housing mounted on a frame plate and containing an oil-like liquid to provide acoustic communication and an impedance match between the sea water and the crystals, and the use of a flexible and stretchable cable to suspend the array with two degrees of rotational freedom and one degree of elastic freedom.

In a number of recent applications, it has been found desirable to have submarine compressional wave receptive apparatus which will maintain a vertical beam axis. For example, such apparatus may be disposed in the approaches to a water lock. The speed of a vessel approaching the lock can be automatically taken into account from the information provided by the responses from the receptive apparatus, and the lock may be opened at the proper time. It is easily seen that in such a case, the information given by the receptive apparatus must be accurate under all conditions.

Another example may arise in connection with operations for detecting sources of compressional wave disturbances. If an area of the sea can be quickly covered with transducers, it can be determined with a satisfactory degree of certitude whether or not a source of compressional wave disturbances is present, and if so, movements of this source can be followed with facility. In addition, data gleaned from measurements of various compressional wave disturbances by the receptive apparatus of the invention will indicate the nature of the source. The coverage of a large area of sea in a short time may be accomplished by dropping such receptive apparatus and associated devices from aircraft. Accordingly the apparatus must be self-actuating and highly shock-resistant.

As will appear hereinunder, it has been found entirely practicable in this invention to construct receptive apparatus for use with submarine compressional wave systems which will meet the requirements pointed out above. In addition, the invention provides for the cooperative use of electronic amplifiers and other devices.

The principles of this invention will be more readily understood from the following detailed description and drawings, of which:

Figure 1 is a section through the center of an embodiment of the invention which is attached to the top side of a water-tight box or enclosure which contains electronic and other associated apparatus.

Fig. 2 is a section on line 2—2 of Fig. 1, on a smaller scale.

Fig. 3 shows a face view of the transducer of the embodiment of Figures 1 and 2, and Fig. 4 shows a cutaway side view of the same transducer.

Fig. 5 is an enlarged fragmentary view showing structure of the elastic cable.

The elements of an embodiment of the invention are illustrated in Figure 1. These are an array of piezoelectric elements forming an electroacoustic transducer 10, a flexible cable 11 suspending the mounting of the transducer 10, and a rubber dome 12 filled with castor oil or other suitable liquid. Flexible cable 11 has conductor leads 101 and 102 spirally wound in its interior. In the construction of this cable the conductors are formed spirally and then are dipped in latex, the ensuing combination being extremely elastic, as well as serving to insulate one conductor from the other and thus forming an elastic, flexible, insulated conducting cable. Flexible cable 11 leads to the transducer 10 through Bakelite tube 13. This tube forms a stationary supporting element for the transducer, the top of the tube determining the point of support of the transducer. The tube is of sufficient length to maintain the geometrical center of the mounted transducer in such a position that possibility of contact of the transducer mounting with the rubber dome is effectively removed. The length of cable 11 between the top of tube 13 and the transducer 10 is made short enough to eliminate danger of fouling, and long enough to permit rotational freedom of the transducer. The leads 101 and 102 are brought out from cable 11 through an opening near the bottom of Bakelite tube 13 to terminals 103 and 104 on terminal board 105. The terminal board 105 is mounted on frame plate 19, which in this embodiment may be visualized as a part of a side plate of a water tight box or enclosure 50 containing an electronic amplifier 200, and associated gear. The terminals 103 and 104 and a neutral terminal 106 on the board serve as binding posts for the conductors of output cable 17 which passes through frame plate 19, in going to electronic amplifier 200. This cable is shown in a position elevated from its normal. A rubber gasket 29, a metal washer 20 and a larger washer 21, secured to the metal plate 19 by means of four screws 22, forms an oil-tight seal through which output cable 17 may pass without having the oil or other liquid seep into the interior of the enclosure 50 containing electronic amplifier 200. A screw 23 plugs an opening in the plate 19 through which oil may be introduced and evacuated from the dome 12. The rubber dome 12 is molded to a metal ring 25. Bolts 26 and nuts 27, regularly spaced around the ring, secure the dome to the frame plate 19.

In Figure 2 is shown a top view of the same embodiment in which a part of the dome 12 is cut away to bring the interior into evidence. The metal ring 25 surrounds the cutaway part of the dome, and the tops of bolts 26 and nuts 27 are seen to be regularly spaced around the ring 25. Elastic cable 11 issues from the top of the Bakelite tube 13, which is seen to be located centrally in respect to the base plate and rubber dome. The conductors 101 and 102 are depicted issuing from the flexible cable 11 which protrudes from Bakelite tube 13 near its bottom. The conductors 101 and 102 are fastened to terminals 103, 104 on the Bakelite terminal strip 105. Two of the conductors of output cable 17 are arranged to be fastened on the same terminals, (with the addition of a single conductor fastened to a ground terminal), and the output cable 17 is fixed in a special position relatively to the terminal board 105 by means of a clamp 28. In Figure 1 the output cable is shown unclamped and elevated for purposes of illustration.

Figure 3 depicts a face view of the piezoelectric transducer 10 mounted in a truncated biconically shaped cork mounting 300. The cork mounting 300 is of sufficient size as to easily float the combination; the dimensions must be such that it must not touch the sides of the dome or base plate in its possible motions and at the same time its geometrical center must be close to the geometrical center of the dome, as illustrated in Figure 1. A square array of nine crystals 30 is shown in Figure 3. U-shaped electrodes 32 in contact with crystals 30 place these crystals in effective parallel connection. Each electrode 32 is in contact with half the side area of the crystals. The respective electrodes 32 are connected within the cork mounting 300 to conductors 101 and 102 as shown in the section view of Figure 4. The other sides of the crystals are insulated from each other by means of Bakelite, impregnated cloth or phenolic strips 34. The electrodes 32 may be of thin silver or other suitable metal, and the crystal side in contact with the electrode may be silvered or tinned in any well-known manner. Figure 4 shows flexible cable 11 entering the biconical cork mounting 300. When it is formed, the flexible cable 11 has a knob 110 molded at its upper end. In assembling the transducer and mounting, the cable is put through the side of the cork mounting 300 in the space 301 which is filled with a rubber chemical composition, not shown in the figure, at the end of the process, and pulled through the hole at the bottom of the cork mounting 300. The leads 101 and 102 extending beyond the knob 110 are cleared of insulation for a short length 111 and 112 so that the conductors are exposed, and then this exposed conductor section is wound spirally back and forth around the further insulated section of the leads 101 and 102. This is to provide added resistance to shock. Since the conductors may be of very fine wire, such added precaution is necessary. Leads 101 and 102 are then brought through the guide holes filled in the cork body, and soldered to their respective electrodes. The transducer is then inserted in the cork mounting. The crystals 30 are seen to be cemented to a plastic backing member 31. Bakelite insulating strips 35 are added around the entire transducer proper and cemented to the cork mounting. The plastic backing member 31 fits under the Bakelite strip so that when these are cemented to the cork mounting the transducer is secured. The cork mounting reflects acoustic energy well because of its acoustic impedance. A Bakelite top plate 36, of suitable dimensions, fits into a slight depression in the flat face of the cork mounting and is cemented therein, making the cork mounting 300 into the geometrical shape of a truncated cone.

The viscosity of the liquid medium in which the transducer freely floats prevents the flexible elastic cord from wrapping around the Bakelite tube due to movements of the box or enclosure on which the housing is mounted. The action of the viscous medium will generally substantially dissipate the effect of any disturbances. Owing to the degrees of freedom provided by the elastic cable suspension in the liquid medium the transducer will always regain its receptive properties despite the shock of entering the water or shock arising from severe compressional disturbances, and despite motions of the box or enclosure on which the apparatus may be mounted.

No attempt has here been made to exhaustively cover or point out all applications of the invention. Numerous features and applications other than those pointed out will be apparent to those skilled in the art. The scope of the invention is to be defined in the following claims.

The invention described herein may be manufactured and used by or for the Government of the United States of America for governmental purposes without the payment of any royalty thereon or therefor.

What is claimed is:

1. A receptive apparatus for submarine compressional waves comprising a base plate, a dome mounted on the base plate to form with the plate a fluid tight chamber, a body of liquid contained in the chamber formed by the dome and plate, a supporting tube mounted on the base plate within the chamber and extending from near the center of the plate to near the center of the chamber, a cork imbedded-directional hydrophone situated in the chamber and an elastic flexible cable extending through the supporting tube to the cork-imbedded hydrophone and constituting the sole support therefor, the length of cable extending from the unmounted end of the tube to the hydrophone and the overall size of the cork embedded-hydrophone being limited to prevent contact of the hydrophone with the dome, whereby the hydrophone is floated upwardly from the unmounted end of the supporting tube in various positions of the dome and base plate without contacting the dome.

2. A receptive apparatus for submarine compressional waves comprising a substantially hemispherical fluid tight dome element, a body of liquid filling the interior of said dome, an oil floatable hydrophone assembly, an elastic flexible circuit cable for the hydrophone, a cable supporting member within the dome fixed relative to the dome, said cable being held by the supporting member at substantially the geometric center of the dome and constituting the sole support means between the supporting member and the hydrophone assembly.

HORACE M. TRENT.

REFERENCES CITED

The following references are of record in the file of this patent:

UNITED STATES PATENTS

| Number | Name | Date |
| --- | --- | --- |
| 571,539 | Sawyer | Nov. 17, 1896 |
| 1,401,024 | Wood et al. | Dec. 20, 1921 |
| 1,883,433 | Williams | Oct. 18, 1932 |
| 2,019,497 | Kunze | Nov. 5, 1935 |
| 2,310,017 | Canon et al. | Feb. 2, 1943 |
| 2,407,697 | Williams | Sept. 17, 1946 |
| 2,415,407 | Benioff | Feb. 11, 1947 |
| 2,497,680 | Massa | Feb. 14, 1950 |
| 2,521,642 | Massa | Sept. 5, 1950 |

FOREIGN PATENTS

| Number | Country | Date |
| --- | --- | --- |
| 3,695 of 1915 | Great Britain | Mar. 6, 1919 |